(12) United States Patent
Rex

(10) Patent No.: US 6,585,022 B1
(45) Date of Patent: Jul. 1, 2003

(54) TIRE BUILDING METHOD AND APPARATUS

(75) Inventor: William Allen Rex, Doylestown, OH (US)

(73) Assignee: The Goodyear Tire and Rubber Company, Akron, OH (US)

( * ) Notice: Subject to any disclaimer, the term of this patent is extended or adjusted under 35 U.S.C. 154(b) by 0 days.

(21) Appl. No.: 09/786,244

(22) PCT Filed: Sep. 1, 1998

(86) PCT No.: PCT/US98/18063

§ 371 (c)(1), (2), (4) Date: Feb. 28, 2001

(87) PCT Pub. No.: WO00/12297

PCT Pub. Date: Mar. 9, 2000

(51) Int. Cl.[7] ............................................. B29D 30/26
(52) U.S. Cl. ...................... 156/401; 156/415; 156/416
(58) Field of Search ............................... 156/111, 131, 156/132, 133, 135, 396, 400, 401, 403, 408, 421, 415, 416

(56) References Cited

U.S. PATENT DOCUMENTS

| | | | |
|---|---|---|---|
| 3,281,305 A | * 10/1966 | Nädler et al. ............... | 156/401 |
| 3,990,931 A | * 11/1976 | Leblond et al. ............. | 156/131 |
| 4,087,305 A | * 5/1978 | Touchette et al. ........... | 156/401 |
| 4,226,656 A | * 10/1980 | Appleby et al. ............. | 156/132 |
| 4,243,451 A | * 1/1981 | Kortman ..................... | 156/132 |
| 4,683,021 A | * 7/1987 | Stalter et al. ................ | 156/415 |
| 5,141,588 A | * 8/1992 | VanBuskirk ................ | 156/401 |
| 5,262,115 A | * 11/1993 | Tomlinson .................. | 264/265 |
| 5,405,484 A | * 4/1995 | Wollbrinck et al. ......... | 156/416 |

FOREIGN PATENT DOCUMENTS

| EP | 16570 A1 | * 10/1980 |
|---|---|---|
| EP | 181984 A | * 5/1986 |

* cited by examiner

Primary Examiner—Geoffrey L. Knable
(74) Attorney, Agent, or Firm—Brouse McDowell; Roger D. Emerson

(57) ABSTRACT

A method and apparatus (10) for shaping a tire wherein an outboard pocket assembly (26) and an inboard pocket assembly (24) are radially movable outwardly into engagement with preshaped bead/apex assemblies (60, 76) of a tire band (74) and are movable axially to a cured tire width of the bead/apex assemblies for shaping other tire components to a cured tire shape and for positioning the ply edges at predetermined cured tire positions.

3 Claims, 5 Drawing Sheets

TIRE BUILDING METHOD AND APPARATUS

TECHNICAL FIELD

This invention relates to a method and apparatus for building and shaping a tire with preshaped components positioned in the tire at the same spacing as in the cured tire so that the other components will substantially conform to the shape of the preshaped components in the shaped tire. Also by substantially preshaping the tire to the cured shape the edges of the plies are turned up around the bead and set in predetermined turned up positions that will not be appreciably changed in the tire press.

BACKGROUND ART

In U.S. Pat. No. 5,262,115 a method of producing a tire bead filler assembly is described wherein the bead filler is preshaped and cured about the bead before building in the tire. The advantage of this method is that the bead filler assembly keeps its shape during building of the tire and also the time required for curing the tire in a tire press may be reduced. One of the problems of using precured tire componets is that the other tire components are not shaped to the cured tire shape until the tire is finally shaped in a tire press. This results in repositioning of the tire components in the tire press which is difficult to control with precision and may affect tire quality.

Tire shaping drums, such as the drum shown in U.S. Pat. No. 5,405,484 have been utilized for shaping tire components, however, no provision has been made for shaping the uncured components to the cured tire shape. One of the reasons for not fully shaping the tire has been the limited force available for pushing the beads toward the cured tire positions. Also, no provision has been made for retaining the beads in the pocket assemblies of the drum if the tire were to be shaped to the cured shape. Also the bladder hinge points are not secured to prevent pulling the plies under the tire bead.

DISCLOSURE OF INVENTION

In accordance with the present invention, a new and improved shaping drum and method of building a tire with preshaped components is provided. The shaping drum has segmented pocket assemblies for gripping preshaped bead apexes and moving them to the spacing of the cured tire during shaping of the tire into a belt-tread assembly. The tread may also be precured so that when the tire is cured, the only time required for vulcanization in the tire press is the curing time required for the remaining uncured components.

In accordance with the present invention, there is provided a method of building a tire with a shaping drum having an expandable inboard pocket assembly, an expandable outboard pocket assembly, an inflatable inboard turnup bladder, an inflatable outboard turnup bladder, an inboard sealing flap and an outboard sealing flap connected to said outboard pocket assembly and said inboard pocket assembly comprising:

a. transferring a tire band to a position over the drum,
b. positioning an outboard tire bead over the outboard pocket assembly and an inboard tire bead over the inboard pocket assembly,
c. expanding the outboard pocket assembly and the inboard pocket assembly into sealing engagement with the inboard tire bead and the outboard tire bead,
d. transferring a tread belt assembly to a position over the tire band,
e. inflating the inboard turnup bladder, the outboard turnup bladder and the tire band to expand the tire band into the tread belt assembly, characterized by:
f. simultaneously moving the inboard pocket assembly and the outboard pocket assembly toward a center line of a drum to positions spaced apart a distance which is substantially the same as the distance between the beads of the tire in the cured condition,
g. applying a preshaped component of the tire to the tire band in the cured shape of the tire,
h. stitching the tire tread belt assembly to the expanded tire band with a roller,
i. deflating the inboard turnup bladder, the outboard turnup bladder and the tire band,
j. retracting the inboard pocket assembly and the outboard pocket assembly; and
k. removing the tire from the drum In accordance with another aspect of the invention, there is provided a tire shaping drum comprising a shaft rotatably mounted on a support member at an inboard end of the shaft, an outboard drum section and an inboard section slidably mounted on the shaft at spaced apart positions, screw means mounted in the shaft and operatively connected to the inboard drum section and the outboard section for moving the inboard drum section and the outboard drum section together and apart upon rotation of the screw, each inboard drum section and outboard drum section having a cylindrical frame, a plurality of bead pocket segments mounted on each frame and spaced circumferentially around the shaft, radially extending spoke members attached to each of the bead pocket segments and slidably mounted in radially extending slots in the frame, piston cylinder assemblies mounted on the drum sections having pistons connected to sliding cams engagable with the spoke members to radially expand the pocket segments for retaining a shaping bladder and providing a bead seat characterized by each of the segments having a circumferentially extending channel for mounting a first edge and a second edge of the bladder, a flange on a first side of the channel and a removable nose piece on a second side of the channel for removal during mounting of the first edge and the second edge of the bladder in the channel with a minimum stretching of the first edge and the second edge of the bladder.

In accordance with a still further aspect of the current invention, there is provided a pocket assembly for a tire building drum of the type having a plurality of circumferentially spaced expandable segments for retaining a shaping bladder and providing a bead seat characterized by each of the segments having a circumferentially extending channel for mounting a first edge and a second edge of the bladder, a flange on a first side of the channel, and a removable nose piece on a second side of the channel for removal during mounting of the first edge and the second edge of the bladder in the channel with a minimum stretching of the first edge and the second edge of the bladder.

DETAILED DESCRIPTION OF THE INVENTION

Figure 1:
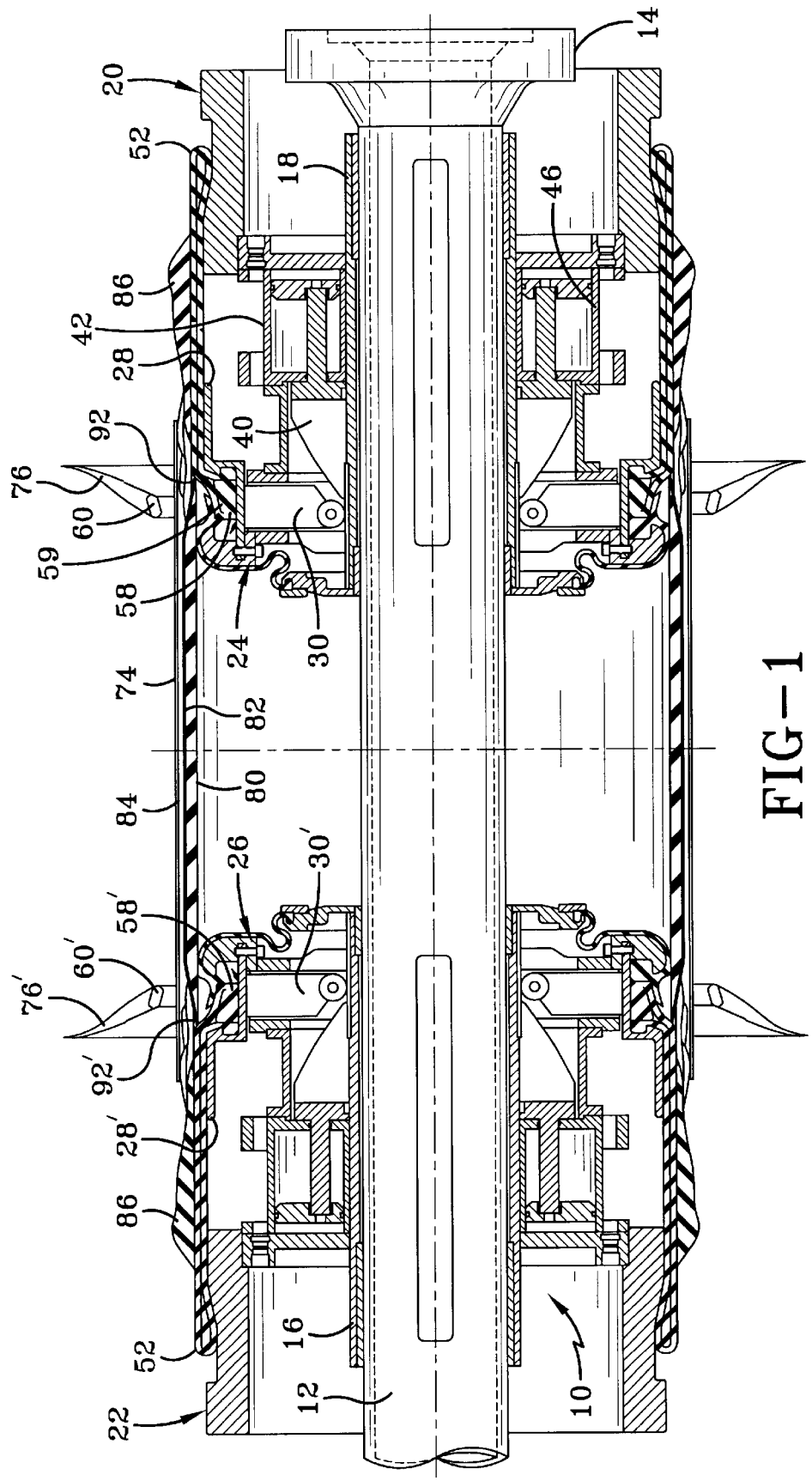
FIG. 1 is a cross section of the shaping drum embodying the invention showing the tire band on the drum and the bead apexes in position for seating in the pockets.

Referring now to the drawings and especially to FIG. 1 a tire shaping drum 10 is shown in the retracted condition having a drum shaft 12 with a mounting flange 14 for attachment to a rotatable drum support assembly in a supporting housing (not shown). Slidably mounted on the drum shaft 12 are an outboard drum section 16 and an inboard drum section 18. Radially outward of the inboard drum section 18 is a cylindrical support assembly 20, slidably mounted on the drum section 18. Radially outward of the outboard drum section 16 and inboard drum section 18 are cylindrical support assemblies 20 and 22 mounted on the drum sections 16 and 18.

The drum sections 16 and 18 are connected to a screw drive (not shown) extending through the drum shaft 12 and rotatable to adjust the spacing of the inboard drum section 18 and the outboard drum section 16 and thereby provide the desired spacing of an inboard bead pocket assembly 24 and an outboard pocket assembly 26 mounted on the drum sections 18 and 16 respectively.

Figure 3:
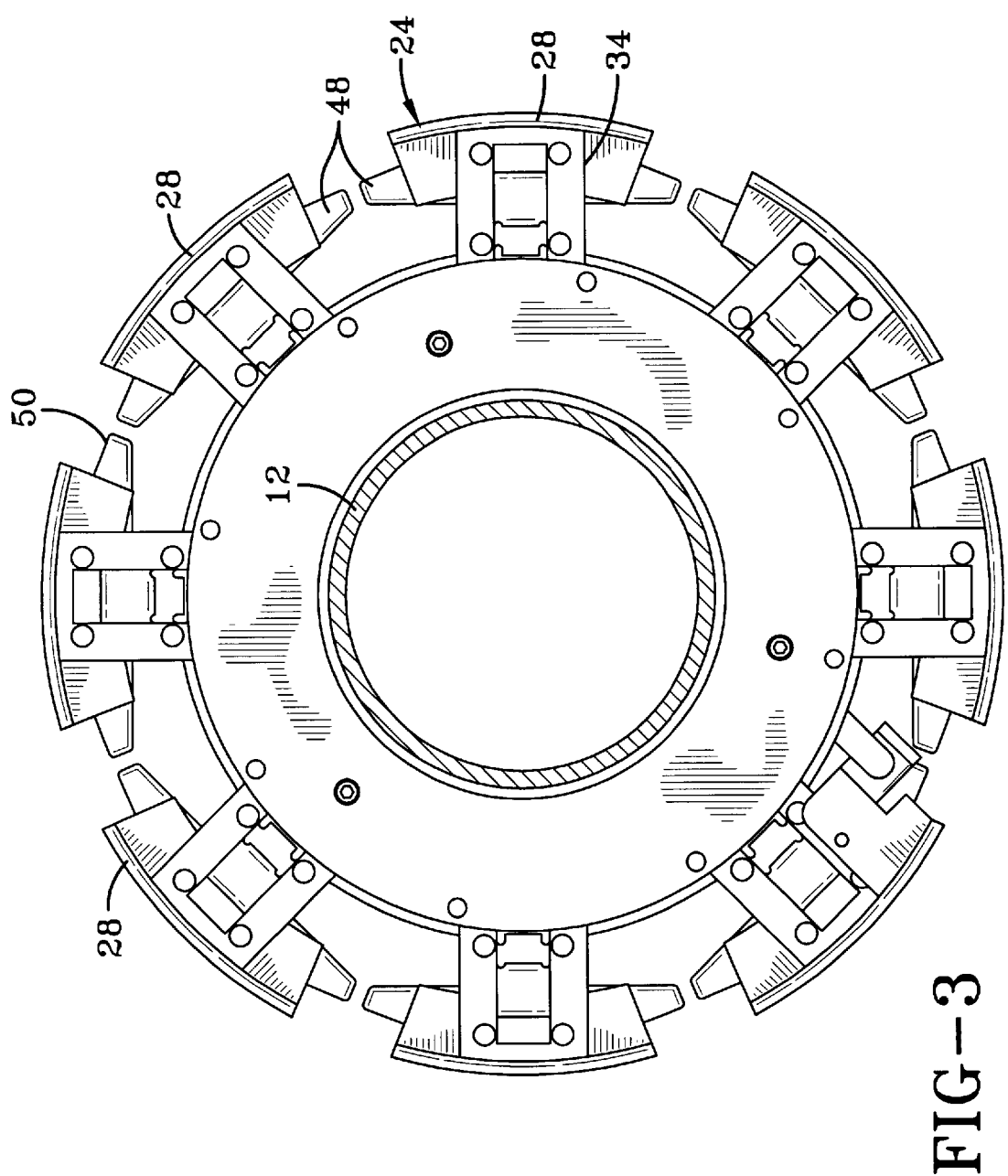
FIG. 3 is a schematic sectional view taken along line 3—3 in FIG. 1 showing the expanded positions of the pocket segments with parts being broken away at the outside edge of the pocket segments.
Figure 4:
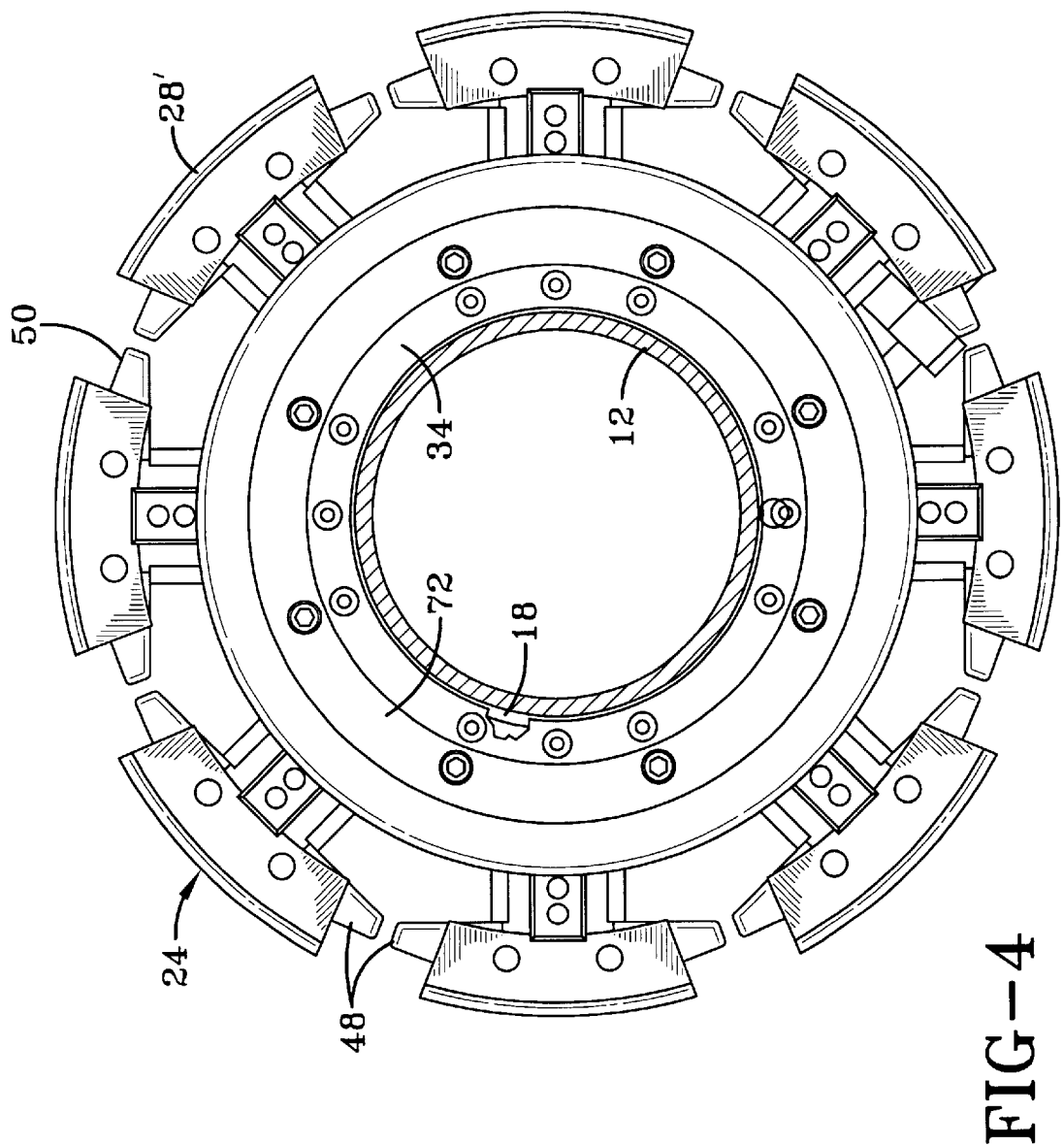
FIG. 4 is a schematic view taken along line 4—4 in FIG. 2 showing the expanded position of the pocket segments with parts being broken away.

The following description of the inboard bead pocket assembly 24 will also apply to the outboard bead pocket assembly 26 where similar parts are indicated by the same number with a prime mark. As shown in FIGS. 3 and 4, the inboard bead pocket assembly 24 has a plurality of circumferentially spaced expandable cylindrical segments 28. In this embodiment there are eight segments 28 and each of the segments is mounted on a radially extending spoke 30 supported in a slot 32 in a cylindrical frame 34 mounted on the inboard drum section 18. The spoke 30 may have a cam roller 36 for rolling engagement with a cam surface 38 on an axially extending sliding cam 40. Each sliding cam 40 may be connected to a piston cylinder assembly 42 mounted on the inboard drum section 18. A piston 44 of the piston cylinder assembly 42 is connected to the cam 40 and is movable upon communication of air pressure to a cylinder 46. The air pressure may be factory air pressure of 100 p.s.i. (7.03 kg sq cm) and with the enlarged diameter of the piston 44 provides a substantially high pressure for extending the spoke 30 radially outward and moving the cylindrical segment 28 radially outward.

Each cylinder segment 28 has circumferentially extending fingers 48 in meshing engagement with fingers of an adjacent segment to provide a continuous cylindrical surface 50 around the drum for supporting a shaping bladder 52.

Figure 2:
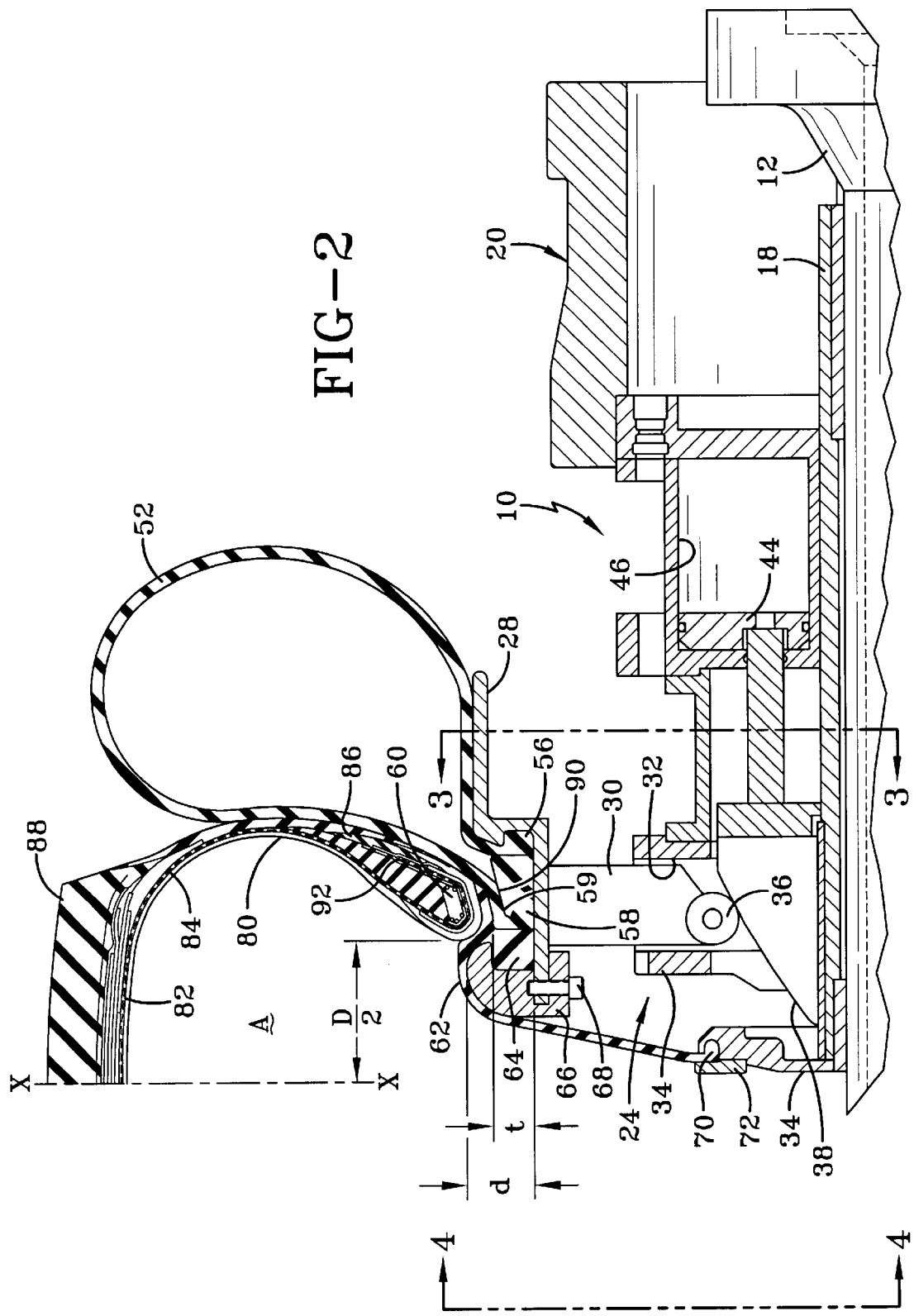
FIG. 2 is a view like FIG. 1 of one half of the shaping drum in the expanded condition with the tread belt applied, the sidewall turned up and the bead pocket assembly moved to a position where the distance between the beads is the same as the bead spacing in the cured tire. The position of the ply edges after shaping is also shown in detail.
Figure 5:
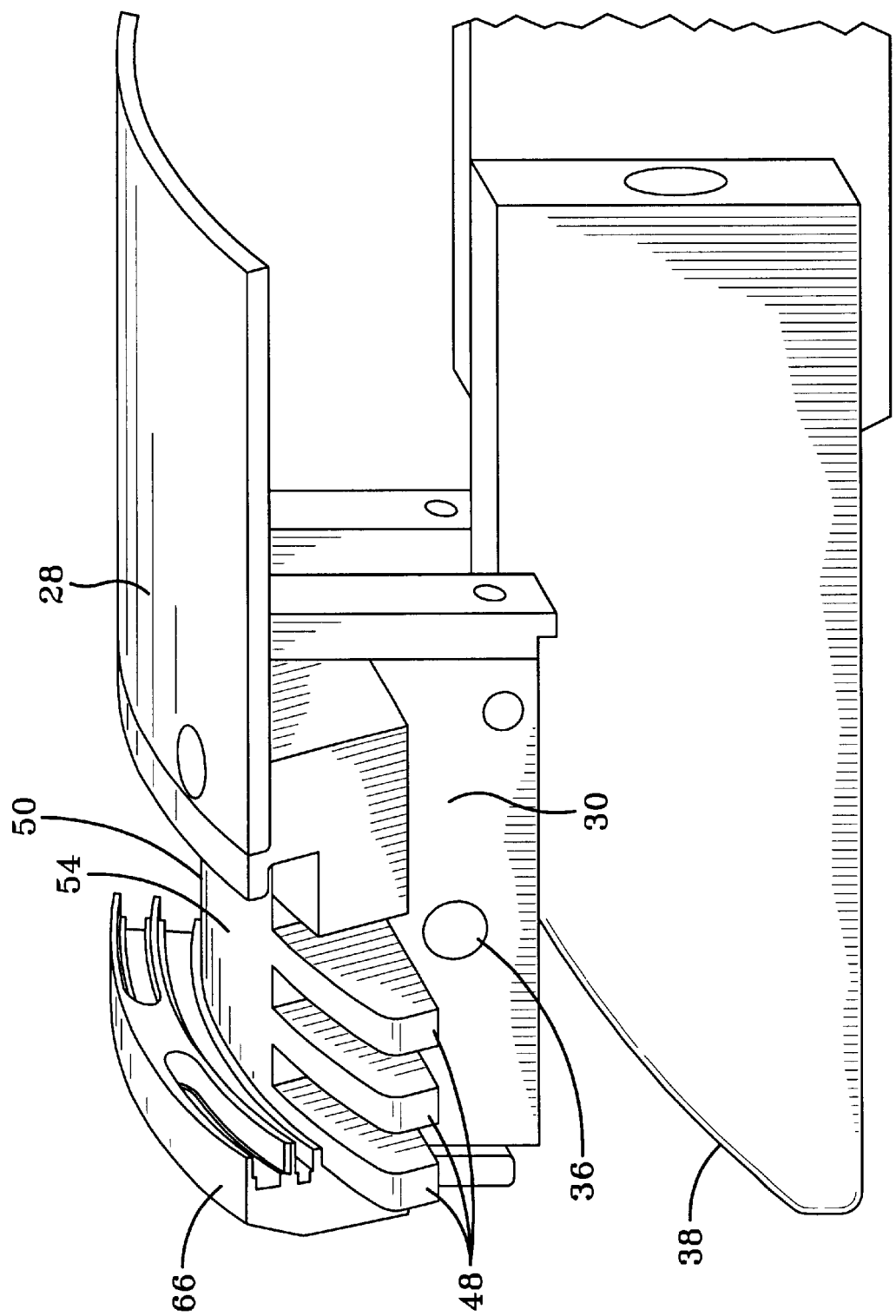
FIG. 5 is a detailed fragmentary view in perspective of a pocket segment showing the cam for expanding the pocket segment.

As shown in FIGS. 1, 2, and 5, each of the cylindrical segments 28 has a pocket 54 in the form of a circumferentially extending channel for receiving an inboard edge 56 and an outboard edge 58 of the bladder 52. The outboard edge 58 of the bladder 52 may be enlarged with a thickness "t" of about 0.9 inches (2.28 cm) for seating in the pocket 54.

The thickness "t" of the outboard edge 58 is less than the depth "d" of the pocket 54 so that a tire bead 60 will not be pulled out of the respective pocket when the outboard drum section 16 and inboard drum section 18 are moved together to the spacing of the cured tire as shown in FIG. 2. The outboard edge 58 of the bladder 52 is folded over to provide a hinge point 59 under the preshaped bead apex 76.

A sealing flap 62 has an outer edge 64 which is clamped between a nose piece 66 and corresponding cylinder segment 28 of each pocket 54. The nose pieces 66 may be removed to install the outboard edge 58 of the bladder. Screws 68 may be used to fasten the nose piece 66 to the segment 28. The sealing flap 62 also has an inner edge 70 which may be attached to a flange 72 connected to the inboard drum section 18.

Referring to FIG. 2, the drum 10 is shown in more detail supporting a tire 74 with bead apexes 76,76 positioned at the same spacing or distance D/2 from the centerline X—X of the tire as the spacing of the beads for a cured tire.

Referring to FIG. 1, the drum 10 is shown in the retracted condition with a tire band 74 supported on the drum. An outboard bead apex 76 and an inboard bead apex 76' are shown positioned over the bead pocket assemblies 24 and 26. The bead apex 76 and bead apex 76' are preshaped to the same shape they have in a cured tire and may be precured. A carriage (not shown) with magnets may be used to carry the bead apexes 76 and 76' to the positions shown in FIG. 1 where they are held until the tire band 74 is shaped. The tire band 74 may also be assembled on a band drum (not shown) after which the band is transferred by means well known in the art to a position over the shaping drum 10 as shown in FIG. 1.

The tire band 74 shown in FIG. 1 includes an inner liner 80, a barrier 82, a ply 84, a sidewall 86 and other components such as chafers, fabric chafers, apex members and gum chafers. A tread belt assembly 88, shown in FIG. 2 may also be preassembled and transferred to a position over the drum 10 prior to expansion of the drum. Inflation means is provided in communication with the space. "A" enclosed by the tire 74 and sealing flaps 62.

In operation, the inboard bead pocket assembly 24 and the outboard bead pocket assembly 26 are expanded by communicating air under pressure to the cylinder 46 of each inboard pocket assembly 24 and to cylinder 46' of each outboard pocket assembly 26, causing the cams 40 or 40' to engage the rollers 36 and 36' on the spokes 30 and 30' and move the spokes radially outward and expanding the cylindrical segments 28 and 28'. The outboard bead apex assembly 76 and the inboard bead apex assembly 76' are then seated in the pockets 54 and 54' providing a sealed space "A" within the tire band 54,54'.

The outboard drum section 16 and the inboard drum section 18 are then moved together while the tire band 74 is inflated and expanded to the shape shown in FIG. 2. Also the shaping bladders 52,52' are inflated, wrapping ply 84 and sidewalls 86 around the sides of the shaped tire band as shown in FIG. 2. A radially inner edge 90,90' of the bladder 52,52' is positioned under the pocket 54,54' so that a ply edge 92,92' of the tire band 74 is turned up and positioned at a predetermined location on the shaped tire band. The tread-belt assembly 88 is positioned over the tire band 74 during the shaping and receives the expanded crown portion of the tire band as shown in FIG. 2. The outboard drum section 16 and inboard drum section 18 are moved together by air pressure communicated to the piston cylinder assemblies 42 for each of the cylindrical segments 28. This movement continues until the inboard bead pocket assembly 24 and outboard bead pocket assembly 26 are spaced apart a distance D, which is in this embodiment is about 6 inches (15.18 cm). This distance is substantially the same as the distance between the beads 60,60' of the tire band 74 in the cured condition. The shaping bladders 52,52' are then deflated and the tread belt assembly 88 is stitched to the tire band. In this manner the preshaped bead/apex assemblies 76 and 78 are positioned in the tire band with the other components which have now been shaped to the cured tire shape.

The tire band 54,54' may then be deflated and the spokes 30 may be retracted radially for removal of the assembled tire band 74, which is now ready for curing in a tire vulcanizer (not shown). It is evident that the tire band 74 in the fully cured shape may be cured in the tire vulcanizer with substantially little additional shaping and therefore avoid the possibility of altering the positions of the tire components. This is especially true with respect to the ply edges 92 and 92' where it is important that they not be pulled down during the vulcanization process.

What is claimed is:

1. A tire-building drum having a plurality of circumferentially spaced expandable segments for retaining a turn-up bladder and providing a bead seat characterized by each of said segments having a circumferentially extending channel for mounting a first edge and a second edge of said turn-up bladder, a flange on a first side of said channel, and a removable nose piece on a second side of said channel for removal during mounting of said first edge and said second edge of said bladder in said channel with a minimum stretching of said first edge and said second edge of said bladder said first edge of said turn-up bladder being located at said bead seat and having an increased thickness to provide a resilient mounting for said bead, said turn-up bladder extending from said first edge located under said bead portion of said tire to provide a turn-up of an outer ply of a tire and fixing of an edge of said ply at a predetermined location on said tire upon inflation of said bladder.

2. A tire-building drum according to claim 1 further characterized by said tire-building drum having a sealing flap with an inner edge for mounting on a flange in sealing engagement with a supporting shaft and an outer edge mounted in said channel.

3. A tire-building drum according to claim 2 further characterized by said outer edge extending over said nose piece and being clamped by said nose piece.

\* \* \* \* \*